United States Patent
LaBerge et al.

(10) Patent No.: US 6,804,764 B2
(45) Date of Patent: Oct. 12, 2004

(54) WRITE CLOCK AND DATA WINDOW TUNING BASED ON RANK SELECT

(75) Inventors: Paul A. LaBerge, Shoreview, MN (US); Jim Dodd, Shingle Springs, CA (US)

(73) Assignee: Mircron Technology, Inc., Boise, ID (US)

( * ) Notice: Subject to any disclaimer, the term of this patent is extended or adjusted under 35 U.S.C. 154(b) by 151 days.

(21) Appl. No.: 10/054,556

(22) Filed: Jan. 22, 2002

(65) Prior Publication Data

US 2003/0140208 A1 Jul. 24, 2003

(51) Int. Cl.$^7$ ............................................. G06F 12/00
(52) U.S. Cl. ..................... 711/170; 711/202; 711/206; 711/254; 711/167; 714/7; 714/731
(58) Field of Search ................................. 711/170, 202, 711/206, 154, 167; 714/7, 731

(56) References Cited

U.S. PATENT DOCUMENTS

| | | | | |
|---|---|---|---|---|
| 5,758,056 A | * | 5/1998 | Barr | ............................... 714/7 |
| 6,092,165 A | * | 7/2000 | Bolyn | ........................ 711/167 |
| 6,292,903 B1 | * | 9/2001 | Coteus et al. | ............... 713/401 |
| 6,330,683 B1 | * | 12/2001 | Jeddeloh | ..................... 713/401 |
| 6,442,722 B1 | * | 8/2002 | Nadeau-Dostie et al. | ... 714/731 |
| 6,556,489 B2 | * | 4/2003 | Gomm et al. | ............... 365/194 |

* cited by examiner

Primary Examiner—Mano Padmanabhan
Assistant Examiner—Mehdi Namazi
(74) Attorney, Agent, or Firm—Fletcher Yoder

(57) ABSTRACT

A configuration register used to adjust a clock or request signal with respect to the other. Specifically, a look-up table is provided in the memory controller. The look-up table is filled at bootup such that it contains test information from a master look-up table in the system BIOS, for instance. The look-up table in the memory controller stores current test data correlative to optimal sampling times for the current configuration. Adjustable delay elements or adjustable load elements may be used to change the relative sampling time of the request signal correlative to the values stored in the memory controller look-up table.

34 Claims, 2 Drawing Sheets

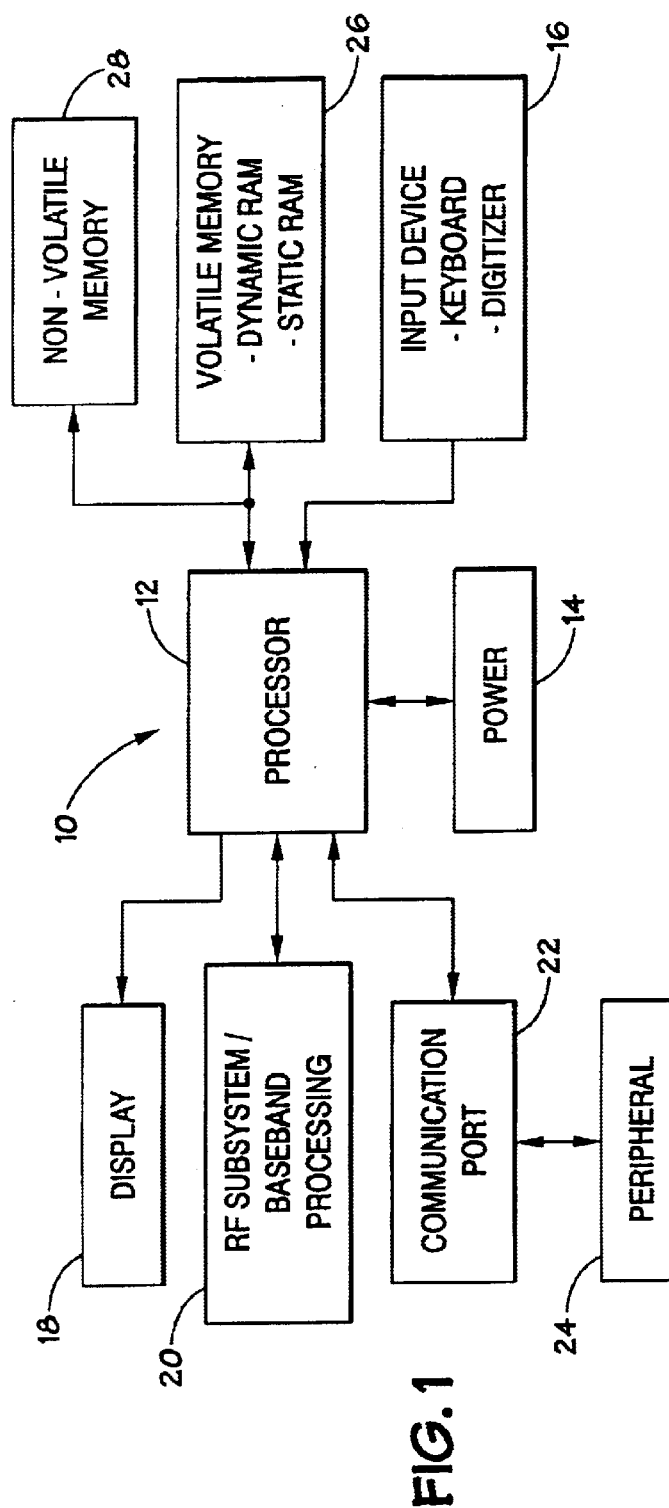
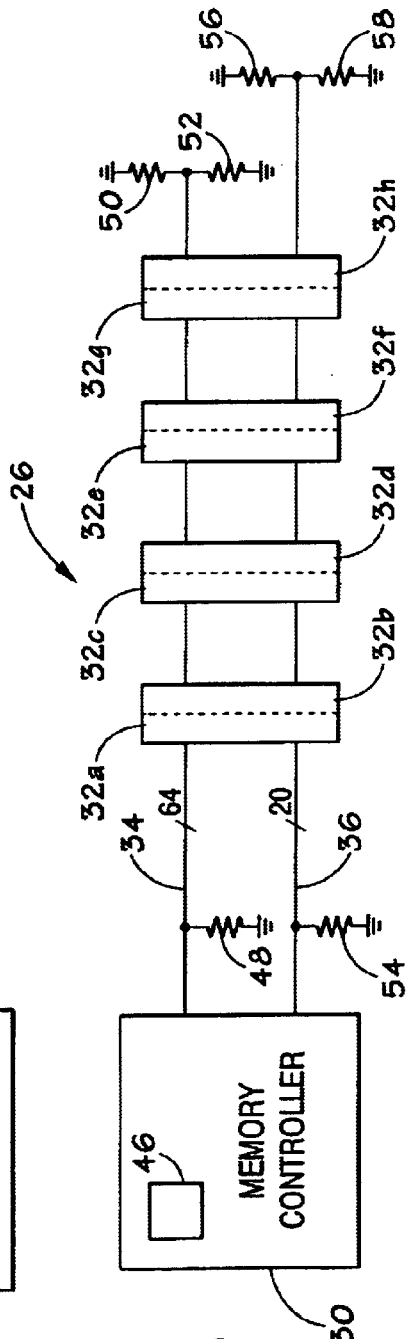
FIG. 1
FIG. 2

WRITE CLOCK AND DATA WINDOW TUNING BASED ON RANK SELECT

BACKGROUND OF THE INVENTION

1. Field of the Invention

The present invention relates generally to memory subsystems, and more specifically to a technique for tuning signals based on the physical location of the signal destination.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In today's high speed computer systems, requests are initiated to the memory sub-system in rapid succession. Historically, memory devices in the memory sub-system have been controlled asynchronously by the processor. In asynchronous systems, the processor strobes the requested address using row and column address select pins on the memory device. The addresses associated with the requests are held for a required minimum length of time. During the hold time, the memory device accesses the address location and after some delay, called the "access time," the memory device writes new data from the processor into its memory or provides data from the address location to its outputs for the processor to read. During this time, the processor waits for the memory device to perform internal functions such as precharging the lines, decoding the addresses, sensing the data, and routing the data through the output buffers. This creates a "wait state" during which the high speed processor is waiting for the memory device to respond. Disadvantageously, this wait state slows the processing speed of the entire system.

An alternate strategy is to provide synchronous control in the system. Synchronous control refers to memory devices which latch information from the processor in and out of the memory devices under the control of a system clock. One particular type of synchronous control is called "source synchronous." Source synchronous systems deliver data along with a clock or strobe signal on the same transmission line. The processor may receive a cycle time indicating how many clock cycles it takes for the memory device in the memory sub-system to complete its task so that the processor can simultaneously perform other tasks while the memory device is processing its request. Advantageously, synchronous systems reduce or eliminate propagating multiple timing strobes through the system since the system clock may be the only timing edge that is provided to the memory sub-system. Synchronous timing simplifies the inputs of the memory device from an external perspective as well, since all signals, addresses, and data can be latched simultaneously rather than requiring the processor to monitor various timings such as setup and hold times. The output data is also simplified since the data will be in the output buffer latch on the appropriate cycle and the processor needs only to clock it out. Further, complex timing diagrams, which may be necessary to operate asynchronous memory systems, are not required in synchronous systems.

Synchronous systems, however, do offer additional design challenges. One such challenge is maintaining optimal alignment of a data or command signal with respect to the clock signal. Because data is latched on a rising or falling clock edge, it is generally desirable to align the clock edge with the strongest point in the data signal, usually the center of the periodic peek or the "eye" of the data. In systems incorporating multiple memory slots arranged along a bus, data integrity may be different at different slot locations. Each of the slots may be configured to hold a memory module comprising a plurality of memory devices. In a high speed computer memory sub-system with multiple slots or ranks of memory, each rank has a different physical location relative to the other ranks and the memory controller which may be tasked with providing access to each of the various memory slots. Data integrity is difficult to maintain and varies depending on the physical location of the slot as well as the loading at various points in the memory sub-system. Because a request signal may look different at various locations along the bus, it is difficult to align the clock signal such that it is optimized for requests going to the various slots along the memory bus. What is optimal for a memory module at a first location may not be optimal for a memory module at a second physical location along the bus since the data eye may be shifted, skewed, or degraded.

The present invention may address one or more of the concerns set forth above.

BRIEF DESCRIPTION OF THE DRAWINGS

The foregoing and other advantages of the invention will become apparent upon reading the following detailed description and upon reference to the drawings in which:

FIG. 1 illustrates a block diagram of an exemplary processor based device;

FIG. 2 illustrates an exemplary memory sub-system in accordance with the present techniques.

DETAILED DESCRIPTION OF SPECIFIC EMBODIMENTS

Figure 3:
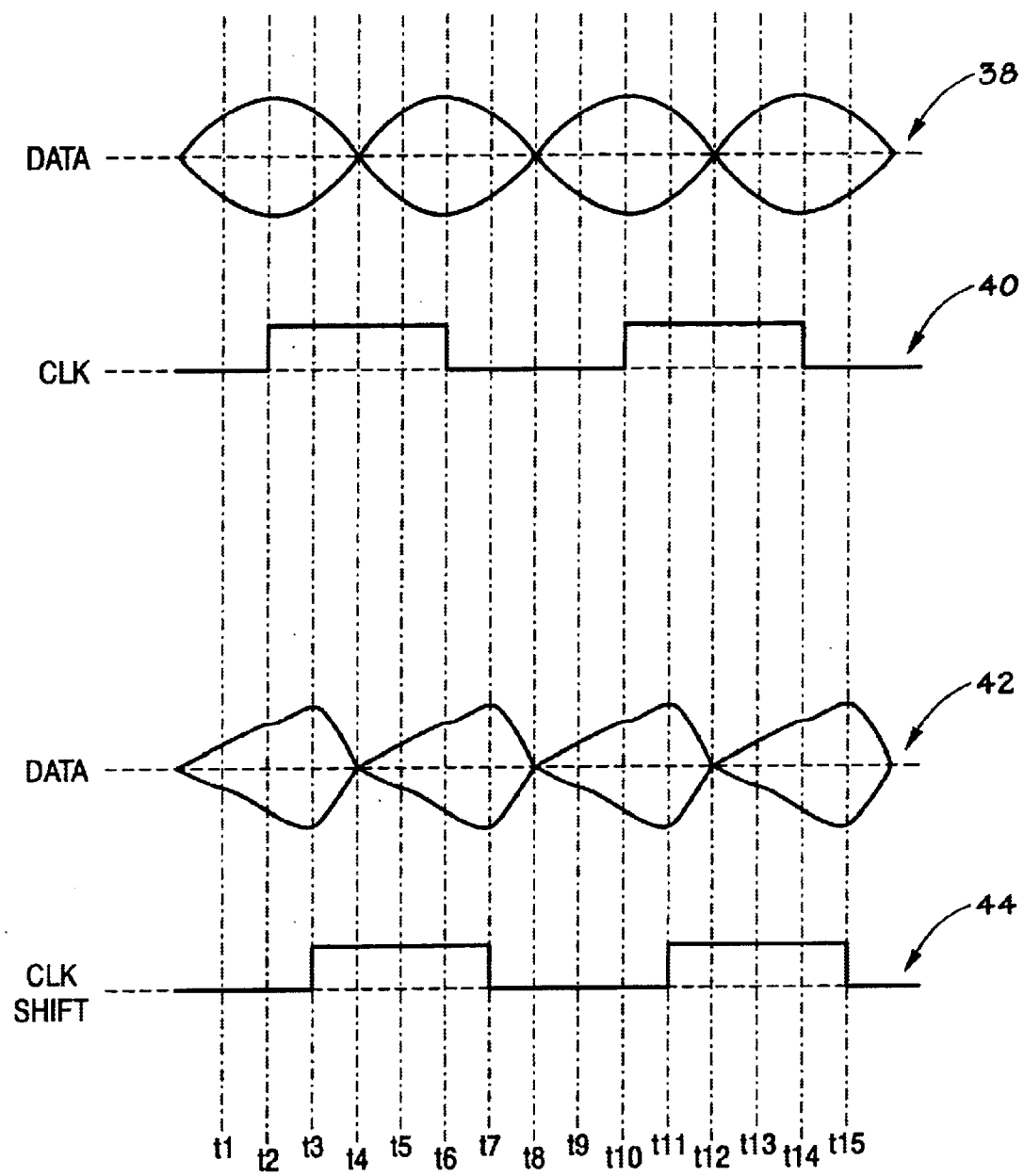
FIG. 3 is a timing diagram illustrating the tuning techniques in accordance with the present embodiment.

One or more specific embodiments of the present invention will be described below.

In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Turning now to the drawings, and referring initially to FIG. 1, a block diagram depicting an exemplary processor-based system, generally designated by reference numeral 10, is illustrated. The system 10 may be any of a variety of types such as a computer, pager, cellular phone, personal organizer, control circuit, etc. In a typical processor-based device, a processor 12, such as a microprocessor, controls the processing of system functions and requests in the system 10.

The system 10 typically includes a power supply 14. For instance, if the system 10 is a portable system, the power supply 14 may advantageously include permanent batteries, replaceable batteries, and/or rechargeable batteries. The power supply 14 may also include an AC adapter, so the system 10 may be plugged into a wall outlet, for instance. The power supply 14 may also include a DC adapter such that the system 10 may be plugged into a vehicle cigarette lighter, for instance. Various other devices may be coupled to the processor 12 depending on the functions that the system 10 performs. For instance, a user interface 16 may be coupled to the processor 12. The user interface 16 may include buttons, switches, a keyboard, a light pen, a mouse, and/or a voice recognition system, for instance. A display 18 may also be coupled to the processor 12. The display 18 may include an LCD display, a CRT, LEDs, and/or an audio display, for example. Furthermore, an RF sub-system/baseband processor 20 may also be couple to the processor 12. The RF sub-system/baseband processor 20 may include an antenna that is coupled to an RF receiver and to an RF transmitter (not shown). A communications port 22 may also be coupled to the processor 12. The communications port 22 may be adapted to be coupled to one or more peripheral devices 24 such as a modem, a printer, a computer, or to a network, such as a local area network, remote area network, intranet, or the Internet, for instance.

Because the processor 12 controls the functioning of the system 10 by implementing software programs. Generally, the memory is coupled to the processor 12 to store and facilitate execution of various programs. For instance, the processor 12 may be coupled to the volatile memory 26 which may include Dynamic Random Access Memory (DRAM) and/or Static Random Access Memory (SRAM). The processor 12 may also be coupled to non-volatile memory 28. The non-volatile memory 28 may include a read-only memory (ROM), such as an EPROM, and/or flash memory to be used in conjunction with the volatile memory. The size of the ROM is typically selected to be just large enough to store any necessary operating system, application programs, and fixed data. The volatile memory 26 on the other hand, is typically quite large so that it can store dynamically loaded applications and data. Additionally, the non-volatile memory 28 may include a high capacity memory such as a tape or disk drive memory.

FIG. 2 generally illustrates a block diagram of a portion of a memory sub-system, such as the volatile memory 26. A memory controller 30 is generally provided to facilitate access to the storage devices. While the present embodiment illustrates the memory controller 30 as existing in the memory sub-system, the memory controller 30 may be in the processor 12 or may exist in a completely separate chip, as can be appreciated by those skilled in the art. The memory controller 30 may receive requests to access the memory devices via one or more processors, such as the processor 12, via other systems, and/or via peripheral devices such as the peripheral device 24. The memory controller 30 is generally tasked with facilitating the execution of the requests to the memory devices and coordinating the exchange of information to and from the memory devices. The memory sub-system may include a plurality of slots or ranks 32A–32H which are configured to operably couple a memory module, such as a dual inline memory module (DIMM), to the memory controller 30 via one or more memory buses 34, 36. Each DIMM generally includes a plurality of memory devices such as Synchronous Dynamic Random Access Memory (SDRAM) devices capable of storing data.

When a request, such as a write request, is received at the memory controller 30, the request includes data to be written to a memory device, as well as an address corresponding to a particular location on the particular memory device to be written. As previously discussed, in a synchronous system, data may be sent between the memory controller 30 and the memory devices located at ranks 32A–32H via a memory data bus 34. The memory data bus 34 actually comprises a plurality of single bit memory data buses each coupled from the memory controller 30 to an individual memory device. In one embodiment of the volatile memory 26, the memory data bus 34 may include 64 individual data buses. In this embodiment, each of the eight memory ranks 32A–32H is capable of supporting a module comprising eight individual memory devices. Further, the memory data bus 34 may include one or more individual buses to each memory rank 32A–32H which may be used for ECC error detection and correction. As can be appreciated by those skilled in the art, the number of individual buses in the memory data bus 34 will vary depending on the configuration and capabilities of the system 10.

The volatile memory 26 also includes a command bus 36 on which address information such as command address (CA), row address select (RAS), column address select (CAS), write enable (WE), bank address (BA), and chip select (CS), for example, may be delivered for a corresponding request. As with the memory data bus 34, the command bus 36 may actually comprise a plurality of individual command buses. A single command bus may be provided for each corresponding memory device on each corresponding memory module. In the present embodiment, the command bus may include 20 individual buses. Further, the command bus 36 may include an error detection and correction (ECC) bus for each memory rank 32A–32H. As previously explained with reference to the memory data bus 34, a variety of embodiments may be implemented for the command bus 36 depending on the system configuration.

In a synchronous system, information sent on the memory data bus 34 and the command bus 36 is sent synchronously with respect to a clock such as a system clock (not shown). FIG. 3 depicts exemplary data and clock signals to illustrate one of the techniques described herein. An exemplary data signal is illustrated generally by reference numeral 38. The data signal 38 is illustrated as an ideal signal wherein there is no degradation of the signal integrity due to various design characteristics such as bus length and loading. In a situation where the data signal 38 is ideal, it is generally preferable to align the clock signal 40 such that the data signal 38 is sampled at the center of the "data eye" at which time the data signal is the strongest. Thus, in a typical synchronous system which samples data on both the rising and falling edges of the clock, the data signal 38 will be sampled on the rising and falling edges of the clock signal 40, here at times $t_2$, $t_6$, $t_{10}$, and $t_{14}$. However, it may be more desirable to sample the data at a time other than the center of the data eye.

As will be further explained below with further reference to both FIGS. 2 and 3, a more realistic illustration of a true data signal may be shown by data signal 42. Depending on the physical location of the memory device to which (or from which) the data is being transmitted, as well as other design features, such as the loading on the memory data bus 34, the data signal 42 may be somewhat distorted or skewed as illustrated in FIG. 3. In this situation, it may be preferable to sample the data at a time other than at the center of the data eye. By shifting the clock signal as illustrated by clock signal 44, the data signal 42 can be sampled at a different time. Here, the data signal 42 will be sampled on the rising and falling edge of the shifted clock signal 44 at times $t_3$, $t_7$, $t_{11}$, and $t_{15}$. By determining how a data signal may look depending on the bus loads, the population of the memory ranks 32A–32H, and the location (i.e., the rank 32A–32H) to which the data is directed, clock shifts may be incorporated such that the sampling of the data signal at each clock cycle can be optimized.

Returning now to FIG. 2, the present techniques can be more fully described. To implement the present techniques, a look-up table 46 may be provided in the memory controller 30. The look-up table 46 may comprise a plurality of registers, for instance. At bootup, each of the memory ranks 32A–32H is read to provide a present system configuration. Based on the present system configuration, shift values can be written to the look-up table 46 such that, based on the current system configuration, the data signals and clock signals can be optimized with respect to one another dependant on the ultimate target location of a corresponding request. The look-up table 46 is written as a subset of a larger table in the system BIOS which may be part of the non-volatile memory 28. During system design and testing, the system 10 may be tested for various possible configurations. In other words, data and clock signals can be tested for various possible combinations of population and loading and for each of the memory ranks 32A–32E, since data integrity may vary depending on physical location along the memory bus. Based on these test results, a master look-up table with optimizing shift values may be stored in the system BIOS, for example. At bootup, the memory modules that may be present in any or all of the memory ranks 32A–32H provide data corresponding to the amount and type of memory provided on each memory module. By using the master look-up table in the BIOS which provides for various possible system configuration, the current configuration may be sampled from the master look-up table and written to the look-up table 46 in the memory controller 30 for use in the processing of memory requests.

The shifting of the clock signal with respect to the data signal may be accomplished in a variety of ways. In one embodiment, a fine tap delay line may be implemented on the memory data bus 34. As can be appreciated by those skilled in the art, the fine tap delay line may include any desirable number of delay elements such that a signal, here a clock signal, may be shifted a desirable amount. In one embodiment, the fine tap delay line may allow shifting in the range of 10 ps–1000 ps in 10 ps increments. In this case, the look-up table 46 stores a shift value for each respective memory rank 32A–32H which defines the desirable shift by the fine tap delay line for a corresponding request to a specific rank 32A–32H. Alternatively, an adjustable output buffer such as the output buffer 48 may be tied to the individual buses on the memory data bus 34. Each output buffer 48 may be configured to provide a change of impedance in the range of 5Ω to 50Ω for example. In this case, the look-up table 46 would include impedances value corresponding to each of the ranks 32A–32H. By changing the impedance on an individual bus, a signal, such as the clock signal, may be effectively shifted, since a change in output impedance will cause a faster/slower rise time on the output signal. Similarly, active termination values, such as those on the adjustable termination resistors 50 and 52, may be adjusted by values stored in the look-up table 46 to similarly alter the load on the memory data bus 34 and thereby effectively shift the clock signal by a predetermined amount corresponding to each respective rank 32A–32H and dependent upon the current system configuration.

While the present embodiment illustrates techniques for shifting the clock signal with respect to the data signal, it should be evident that the data signal can be shifted with respect to the clock signal in an alternate embodiment. Further, the same techniques can be used on the command bus 36. A fine tap delay line may be used to shift either the command signal or the clock on the command bus 36 correlative to values provided in the look-up table 46 corresponding to the specific memory ranks 32A–32H. An adjustable output buffer 54 may be included on each of the individual command buses on the command bus 36. Alternately, adjustable termination values may be assigned to the active termination resistors 56 and 58 such that the impedance on the command bus 36 may be changed depending on the target location of the request.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of operating a computer system comprising the acts of:

checking of a current memory configuration of the computer system;

writing information corresponding to the current memory configuration to a look-up table in a memory controller, wherein the memory controller is configured to provide access to the memory and wherein the information may be used to shift the signal corresponding to a memory request; and utilizing the delay information to shift a signal corresponding to the memory request.

2. The method of operating a computer system, as set forth in claim 1, wherein the act of checking a current memory configuration comprises the act of checking a current memory configuration during boot-up of the computer system.

3. The method of operating a computer system, as set forth in claim 1, wherein the act of writing information comprises the act of writing timing information to the look-up table in the memory controller.

4. The method of operating a computer system, as set forth in claim 3, wherein the act of writing timing information comprises the act of writing delay information corresponding to a respective memory rank and wherein the delay information corresponds to an associated shift in a clock signal such that the clock signal may be shifted with respect to a corresponding data signal.

5. The method of operating a computer system, as set forth in claim 3, wherein the act of writing timing information comprises the act of writing delay information corresponding to a respective memory rank and wherein the delay information corresponds to an associated shift in a data signal such that the data signal may be shifted with respect to a corresponding clock signal.

6. The method of operating a computer system, as set forth in claim 3, wherein the act of writing timing information comprises the act of writing delay information corresponding to a respective memory rank and wherein the delay information corresponds to an associated shift in a clock signal such that the clock signal may be shifted with respect to a corresponding command address signal.

7. The method of operating a computer system, as set forth in claim 3, wherein the act of writing timing information comprises the act of writing delay information corresponding to a respective memory rank and wherein the delay information corresponds to an associated shift in a command address signal such that the command address signal may be shifted with respect to a corresponding clock signal.

8. The method of operating a computer system, as set forth in claim 1, wherein the act of writing information comprises the act of writing information to the configuration register, the information corresponding to a desirable output impedance on a bus corresponding to a respective memory rank.

9. The method of operating a computer system, as set forth in claim 1, wherein the act of writing information comprises the act of writing information wherein the information may be used to shift a signal corresponding to a write request.

10. The method of operating a computer system, as set forth in claim 1, comprising the acts of:
   testing data integrity for each configuration and for each rank of the memory;
   storing test result information on the results of the testing in a system BIOS; and
   reading the test result information from the system BIOS during the act of booting the computer system.

11. A method of executing requests in a computer system comprising the acts of:
   receiving a memory request at a memory controller, the memory request having a corresponding address and each of a request signal and a clock signal;
   obtaining one of a plurality of shift values from a look-up table, wherein the one of a plurality of shift values corresponds to the rank of the memory request;
   shifting the clock signal with respect to the request signal in an amount determined by the shift value, wherein the act of shifting produces a shifted clock signal; and
   delivering the request signal and the shifted clock signal to a memory device corresponding to the address.

12. The method of executing requests, as set forth in claim 11, wherein the act of receiving comprises the act of receiving a read request at the memory controller.

13. The method of executing requests, as set forth in claim 11, wherein the act of receiving comprises the act of receiving a write request at the memory controller.

14. The method of executing requests, as set forth in claim 11, wherein the act of receiving comprises the act of receiving a request on a data bus.

15. The method of executing requests, as set forth in claim 11, wherein the act of receiving comprises the act of receiving a request on a command bus.

16. The method of executing requests, as set forth in claim 11, wherein the act of shifting the clock signal comprises the act of adding a delay to the clock signal such that the clock signal is aligned with the eye of the request signal.

17. The method of executing requests, as set forth in claim 16, wherein the act of adding a delay to the clock signal comprises the act of adding a delay in the range of 10 ps–1000 ps to the clock signal.

18. The method of executing requests, as set forth in claim 11, wherein the act of shifting the clock signal comprises the act of adjusting an output buffer to change the impedance on a bus on which the shifted clock signal is delivered.

19. The method of executing requests, as set forth in claim 18, wherein the act of adjusting an output buffer comprises the act of adjusting an output buffer to change the impedance on the bus in the range of 5Ω–50Ω.

20. A method of executing requests in a computer system comprising the acts of:
   receiving a memory request at a memory controller, the memo request having a correspondence address and each of a request signal and clock signal;
   obtaining one of a plurality of a shift values from a look-up table, wherein the one of a plurality of shift values corresponds to the rank of the memory request;
   shifting the request signal with respect to the clock signal in an amount determined by the shift value, wherein the act of shifting produces a shifted request signal; and
   delivering the shifted request signal and the clock signal to a memory device corresponding to the address.

21. The method of executing requests, as set forth in claim 20, wherein the act of receiving comprises the act of receiving a read request at the memory controller.

22. The method of executing requests, as set forth in claim 20, wherein the act of receiving comprises the act of receiving a write request at the memory controller.

23. The method of executing requests, as set forth in claim 20, wherein the act of receiving comprises the act of receiving a request on a data bus.

24. The method of executing requests, as set forth in claim 20, wherein the act of receiving comprises the act of receiving a request on a command bus.

25. The method of executing requests, as set forth in claim 20, wherein the act of shifting the request signal comprises the act of adding a delay to the request signal such that the eye of the request signal is aligned with the clock signal.

26. The method of executing requests, as set forth in claim 25, wherein the act of adding a delay to the request signal comprises the act of adding a delay in the range of 10 ps–1000 ps to the request signal.

27. The method of executing requests, as set forth in claim 20, wherein the act of shifting the request signal comprises the act of adjusting an output buffer to change the impedance on a bus on which the shifted request signal is delivered.

28. The method of executing requests, as set forth in claim 27, wherein the act of adjusting an output buffer comprises the act of adjusting an output buffer to change the impedance on the bus in the range of 5Ω–50Ω.

29. A system comprising:
   a memory bus;
   a memory array coupled to the memory bus and comprising a plurality of memory ranks located at different physical locations on the memory bus, wherein each of the plurality of memory ranks is configured to receive a memory module; and
   a memory controller operably coupled to each of the plurality of memory ranks via the memory bus, wherein the memory controller comprises a look-up table comprising a plurality of shift values, each of the plurality of shift values corresponding to one of the plurality of memory ranks, and wherein the memory controller is configured to shift one of a request signal and a corresponding clock signal with respect to the other, wherein the shift is correlative to the shift value associated with the rank to which the request signal is directed.

30. The system, as set forth in claim 29, wherein the memory array comprises a plurality of memory ranks, wherein each of the plurality of memory ranks is configured to dual inline memory module (DIMM).

31. The system, as set forth in claim 29, comprising a fine tap delay coupled to each of the memory controller and the memory bus and configured to provide delay correlative to the shift value associated with the rank to which the request signal is directed.

32. The system, as set forth in the claim 31, wherein the fine tap delay line is configured to provide a delay in the range of 10 ps–1000 ps.

33. The system, as set forth in claim 29, comprising a plurality of adjustable output buffers coupled to each of the memory controller and the memory bus and configured to provide a change in an output impedance of the memory bus correlative to the shift value associated with the rank to which the request signal is directed.

34. The system, as set forth in claim 33, wherein each of the plurality of adjustable output buffers is configured to provide a change in the output impedance on the memory bus in the range of 5Ω–50Ω.

* * * * *

UNITED STATES PATENT AND TRADEMARK OFFICE
CERTIFICATE OF CORRECTION

PATENT NO. : 6,804,764 B2  
DATED : October 12, 2004  
INVENTOR(S) : Paul A. LaBerge and Jim Dodd It is certified that error appears in the above-identified patent and that said Letters Patent is hereby corrected as shown below:

<u>Title page,</u>  
Item [73], Assignee, please correct to read as follows:  
-- Assignee: Micron Technology, Inc. Boise, Idaho (US) --

Signed and Sealed this

Seventh Day of June, 2005

JON W. DUDAS  
*Director of the United States Patent and Trademark Office*